US009239929B1

United States Patent
Yu et al.

(10) Patent No.: US 9,239,929 B1
(45) Date of Patent: Jan. 19, 2016

(54) LOCATION DATA QUARANTINE SYSTEM

(71) Applicant: Google Inc., Mountain View, CA (US)

(72) Inventors: Yan Yu, Sunnyvale, CA (US); Sam Liang, Palo Alto, CA (US); Michael Chu, Los Altos, CA (US); Yuhua Luo, San Jose, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 340 days.

(21) Appl. No.: 13/850,650

(22) Filed: Mar. 26, 2013

Related U.S. Application Data (63) Continuation of application No. 12/775,869, filed on May 7, 2010, now Pat. No. 8,423,791.

(60) Provisional application No. 61/232,061, filed on Aug. 7, 2009.

(51) Int. Cl.
| | | |
|---|---|---|
| *G06F 21/00* | (2013.01) | |
| *G06F 21/60* | (2013.01) | |
| *H04L 29/06* | (2006.01) | |
| *H04L 12/58* | (2006.01) | |
| *H04W 4/02* | (2009.01) | |

(52) U.S. Cl.
CPC .......... *G06F 21/602* (2013.01); *H04L 63/1441* (2013.01); *H04L 51/12* (2013.01); *H04W 4/02* (2013.01)

(58) Field of Classification Search
CPC ..... H04L 63/1441; H04L 51/12; H04W 4/02; G06F 21/602
See application file for complete search history.

(56) References Cited

U.S. PATENT DOCUMENTS

| | | | |
|---|---|---|---|
| 5,794,210 A | 8/1998 | Goldhaber et al. | |
| 6,295,446 B1 | 9/2001 | Rocha | |
| 6,804,701 B2 | 10/2004 | Muret et al. | |
| 6,816,722 B2 | 11/2004 | Blom et al. | |
| 7,680,891 B1 | 3/2010 | Pongsajapan | |
| 7,925,740 B2 | 4/2011 | Nath et al. | |
| 7,996,912 B2 | 8/2011 | Spalink et al. | |
| 2001/0036224 A1* | 11/2001 | Demello et al. | 375/220 |
| 2002/0077897 A1 | 6/2002 | Zellner et al. | |
| 2002/0102993 A1 | 8/2002 | Hendrey et al. | |
| 2004/0064452 A1* | 4/2004 | Matsui et al. | 707/9 |
| 2004/0132464 A1 | 7/2004 | Poykko et al. | |
| 2004/0246856 A1 | 12/2004 | Fukushima | |
| 2005/0202780 A1 | 9/2005 | Kall et al. | |
| 2006/0059092 A1 | 3/2006 | Burshan et al. | |

(Continued)

FOREIGN PATENT DOCUMENTS

WO 03094562 A1 11/2003

*Primary Examiner* — Jeffrey Pwu
*Assistant Examiner* — Thong Truong
(74) *Attorney, Agent, or Firm* — Lerner, David, Littenberg, Krumholz & Mentlik, LLP (57) ABSTRACT

A computer-implemented method and system of quarantining user location information receives from a user device user location information that includes personally identifiable user data and user position data associated with one or more geographic positions of the user. The user location information is temporarily stored in a quarantine data storage database for a predetermined quarantine time, during such time it can be used for various analysis. After the quarantine time, personally identifiable user data of the user location information is filtered out before the user position data is sent for long-term storage to a filtered data storage system.

15 Claims, 5 Drawing Sheets

(56) References Cited

U.S. PATENT DOCUMENTS

| | | |
|---|---|---|
| 2007/0268908 A1 | 11/2007 | Linkola et al. |
| 2008/0182592 A1 | 7/2008 | Cha et al. |
| 2009/0144408 A1 | 6/2009 | Wilf et al. |
| 2009/0248623 A1 | 10/2009 | Adelman et al. |
| 2010/0042833 A1* | 2/2010 | Platt .............................. 713/168 |
| 2010/0088187 A1 | 4/2010 | Courtney et al. |
| 2010/0211997 A1 | 8/2010 | McGeehan et al. |
| 2010/0250727 A1 | 9/2010 | King et al. |
| 2011/0223937 A1 | 9/2011 | Leppanen et al. |
| 2011/0258449 A1 | 10/2011 | Rosner et al. |

* cited by examiner

LOCATION DATA QUARANTINE SYSTEM

CROSS-REFERENCE TO RELATED APPLICATIONS

The present application is a continuation of U.S. application Ser. No. 12/775,869, filed May 7, 2010, which claims the benefit of U.S. Provisional Application No. 61/232,061 filed Aug. 7, 2009, the disclosures of which are hereby incorporated herein by reference.

BACKGROUND OF THE INVENTION

Mapping, navigation and other user-location based applications today collect and utilize user location information to provide users with enhanced services and improve existing location technologies that benefit the user. For example, mapping systems like Google Maps for Mobile can send real-time, updated information to a user's mobile device such as a cell phone to display maps of the user's position as he or she travels from one point to the next, with the help of GPS, cellular or WiFi location technologies. User location information, such as GPS, WiFi and/or cell ID data, is collected by such systems so that this information can be used for the benefit of the user, such as improving the accuracy and coverage of the underlying location technologies or providing the user with location-enhanced services such as street maps, route planners for travel by foot or by car, business locator services, or even providing location-aware advertisements.

Gathering, utilizing, and storing user location information, however, can present a number of challenges. From a privacy standpoint, there should be balance between the need to know a particular user's location for the benefit of the user who desires particular location-related services and information, and privacy concerns about storing information that pairs location information to specific users. Further, in gathering user location data, care must be taken to ensure that the location data being collected and analyzed is legitimate information from actual users and not resulting from third party automated programs attempting to gain access to database information, or to compromise the systems with false user location information.

Thus, with regard to how much and for how long user location information should be collected and stored, there can be tension between the business utility of the information and user privacy. On one hand, the more data collected, the more interesting and useful business uses created for users. As such, collecting comprehensive user location data can help create better products and services for end users. On the other hand, due to the sensitive nature of the location data and user privacy concerns, removing personally identifiable information and/or storing less information may be desirable as well. Therefore, collection and retention of user location data can be a delicate trade-off, often with no single correct solution to the problem.

In addition, location data systems can be subject to unauthorized uses such as by spammers and scrapers who introduce undesirable data and strains into such systems.

BRIEF SUMMARY OF THE INVENTION

One aspect of the invention provides a computer-implemented method of quarantining user location information. The method comprises receiving, at a quarantine server, user location information comprising personally identifiable user data of a user of a data location service and user position data associated with one of more geographic positions of the user; temporarily storing the user location information in a quarantine data storage system for a predetermined quarantine time; analyzing, by a computer associated with the data location service, the user location information stored in the quarantine data storage system during the predetermined quarantine time to generate additional data associated with the user; processing the user location information by the location server to filter out at least a portion of the personally identifiable user data from the user location information to produce filtered user location information; removing the user location information from the quarantine data storage system after the predetermined quarantine time; and sending the filtered user location information to a filtered data storage system for long term storage.

The method can further comprise adjusting the predetermined quarantine time to decrease or increase the allowable time of the analyzing the user location information. The method can also further encrypt the personally identifiable user data and providing the encrypted user data to the quarantine data storage system. The receipt of subsequently sent user location information at the quarantine server can be blocked or allowed based on the encrypted user data. Further, the receipt of subsequently sent user location information at the quarantine server is blocked or allowed based on comparing the encrypted user data with the user position data received.

The processing of the user location information may include analyzing characteristics of the user location information to identify user location information from authorized and unauthorized users, and may further comprise storing data representing users determined to be unauthorized in a blacklist database for preventing future use of user location information data by the data location service. Likewise, it may further storing data representing users determined to be authorized in a whitelist database for allowing future use of user location information data by the data location service.

The user location information may comprise a plurality of user position data points associated with geographic positions of the user, wherein the data points comprise one or more startpoints, endpoints and midpoints representative of travel of the user, and wherein the processing of the user location information comprises removal of at least one of the startpoints and endpoints. The processing of the user location information can further comprise randomly removing one or more midpoint.

During the quarantine time, the user data may be shared with other computers to allow additional services to be provided to the user.

The filtered user location data may also be analyzed for mapping of locations to known cell tower and WiFi locations.

Desirably, the personally identifiable user data of a user is encrypted and stored in an encrypted format in the quarantine data storage system. The encrypting may comprise performing a hashing operation on the personally identifiable user data.

A session of use of the data location service from a particular user may be detected wherein the session comprises the sending of user location data by a particular user over a plurality of time points, and processing the time points to obfuscate linkage between the session and the particular user. The processing of the time points may comprises time-shifting the time points or shifting the time points into one or more predetermined time slots that subdivide a predetermined period of time. The processing of the time points may also comprise removal of one or more of the time points.

A system can also be provided comprising: a quarantine data storage system; a filtered data storage system; and a quarantine server comprising a memory storing instructions and a processor to process information received by the quarantine server from a user device in accordance with the instructions, the instructions comprising: receiving user location information from a user device comprising personally identifiable user data of a user of a data location service and user position data associated with one or more geographic positions of the user; temporarily storing the user location information in the quarantine data storage system for a predetermined quarantine time; analyzing the user location information while temporarily stored in the quarantine data storage system during the predetermined quarantine time to generate additional data associated with the user; processing the user location information to filter out at least a portion of the personally identifiable user data from the user location information to produce filtered user location information; removing the user location information from the quarantine data storage system after the predetermined quarantine time; and sending the filtered user location information to the filtered data storage system for a long term storage A computer-usable recording medium can also be provided including a program executable on a processor, the program comprising: computer code that enables a computer to receive user location information from a user device comprising personally identifiable user data of a user of a data location service and user position data associated with one or more geographic positions of the user; computer code that cause the computer to temporarily store the user location information in the quarantine data storage system for a predetermined quarantine time; computer code that analyzes the user location information while temporarily stored in the quarantine data storage system during the predetermined quarantine time to generate additional data associated with the user; computer code to remove the user location information from the quarantine data storage system after the predetermined quarantine time; computer code that processes the user location information to filter out at least a portion of the personally identifiable user data from the user location information; and computer code that sends the filtered user location information to the filtered data storage system for a long term storage.

Other aspects can include a computer-implemented method of building a user reputation database for use in a user location data system, where the method comprises: receiving, at a quarantine server, user location information comprising personally identifiable data of a user and user position data, wherein the user position data may or may not represent one or more actual geographic positions of the user; temporarily storing the user location information in a quarantine data storage system for a predetermined quarantine time; analyzing, by the quarantine server during the predetermined quarantine time, the user location information to provide a spam score associated with the user position data indicative of whether the user position data represents the actual geographic positions of the user; storing in the quarantine data storage system the spam score associated with the user location information; and providing data indicative of the spam score and the personally identifiable data to a user reputation database and storing a user reputation score in the user reputation database associated with the user based on the spam score.

The method may further comprise providing data indicative of the spam score and the user position data associated with the spam score, without the personally identifiable data, to a filtered data storage system for long term storage.

The method can include determining if the user position data received from a user meets one or more predetermined tolerances, such as determining if the user position data aligns with data indicative of a authorized path of travel or determining if the user position data aligns with data indicative of a path of travel along a roadway.

The method can comprise determining if the frequency of receipt of the user position data is within predetermined speed of travel tolerances, including based on driving speed.

The method can comprise allowing the user access to the user location data system based on the user reputation score of the user. It can further comprise updating the user reputation score of a particular user based on subsequent user location information of the particular user received by the quarantine server. It can also comprise analyzing user location information of a user submitted in more than one format. The user location information may also include location data sent with WiFi signals and cellular signals.

The method may analyze data consistency across user location information submitted by multiple users of a common communication point, such as at least one of a cell tower and a WiFi access point.

The method may analyze the frequency of submission of user identification data of a particular user against predetermined benchmarks based on frequency of submissions of user location information from other users.

The method may also encrypt the personally identifiable user data and providing the encrypted user data to the user reputation database, and the receipt of subsequently sent user location information at the quarantine server can be blocked or allowed based on the encrypted user data or on comparing the encrypted user data with the user position data received.

A system for building a user reputation database for use in a user location data system can also be provided, including: a quarantine server; a quarantine data storage system; a user reputation database; and a filtered data storage system, the quarantine server comprising a memory storing instructions and a processor to process information received by the location server from a user device of a user in accordance with the instructions, the instructions comprising: receiving user location information from a user device comprising personally identifiable data of a user and user position data, wherein the user position data may or may not represent one or more actual geographic positions of the user; temporarily storing the user location information in a quarantine data storage system for a predetermined quarantine time; analyzing during the predetermined quarantine time, the user location information to provide a spam score associated with the user position data indicative of whether the user position data represents the actual geographic positions of the user; storing in the quarantine data storage system the spam score associated with the user location information; and providing data indicative of the spam score and the personally identifiable data to the user reputation database and storing a user reputation score in the user reputation database associated with the user based on the spam score.

Also, a computer-usable recording medium can be provided including a program executable on a processor, the program comprising: computer code to enable a computer to receive user location information from a user device comprising personally identifiable data of a user and user position data, wherein the user position data may or may not represent one or more actual geographic positions of the user; computer code to temporarily store the user location information in a quarantine data storage system for a predetermined quarantine time; computer code to analyze during the predetermined quarantine time, the user location information to provide a spam score associated with the user position data indicative of whether the user position data represents the actual geographic positions of the user; computer code to store in the quarantine data storage system the spam score associated with the user location information; and computer code to provide data indicative of the spam score and the personally identifiable data to the user reputation database and storing a user reputation score in the user reputation database associated with the user based on the spam score.

Still further, an aspect of the invention provides a method of preventing improper requests for information at a server on a network, the server having access to one or more databases comprising geolocation information of nodes on the network and a temporal pattern of requests, the method comprising: receiving a request for the identification of geolocation of a node on the network, the request being associated with a time of the request an originating location of a requestor; determining whether the request for the identification is an improper request, where an improper request includes an originating location which is not proximate to a geolocation of a node on the network and includes a time of the request which is inconsistent with a temporal pattern of requests; denying the request for identification if it is an improper request.

DETAILED DESCRIPTION

One aspect of the invention provides a data quarantine system and method for enabling use and analysis of user location data stored in a relatively short interval over which more complete user location information is available than would be provided in longer-term storage.

Figure 1:
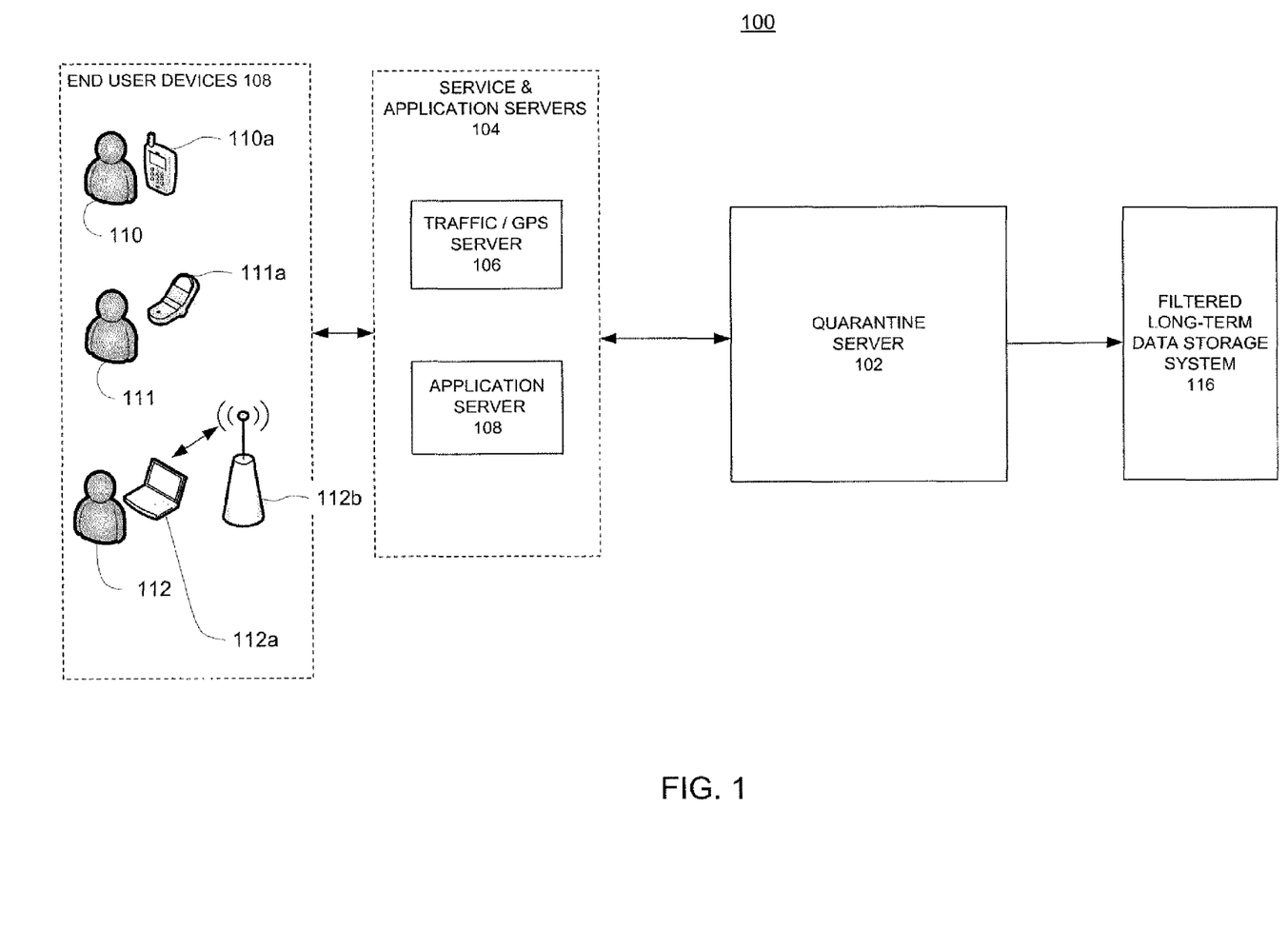
FIG. 1 is a functional block diagram of a location data quarantine system in accordance with an aspect of the invention.

As shown in FIG. 1, data quarantine system 100 may include a quarantine server 102, service and application servers 104 and various end user devices 108. Quarantine server 102 handles user location information originating from end user devices 108 and passed to the quarantine server 102 through service and application servers 104 when the end user is interacting with services provided by service and application servers 104.

Service and application servers 104 may consist of traffic/GPS server 106 and application server 108 and/or other servers with the capability to collect and upload user location information to the quarantine server 102. End user devices 108 may include, for example, user 110 using user device 110a such as a smartphone, user 111 using a user device 111a such as a cell phone with GPS capability, and user 112 using a user device 112a such as wirelessly enabled laptop computer 112a in communication with a wireless hotspot location access point denoted by router 112b.

The end user devices 108 are merely by the way of example and any type of end user device can be used in the system to communicate with and supply user location data directly or indirectly to quarantine server 102. For example, user devices such as cell phones, desktop computers, notebook computers, PDAs, portable GPS units, in-car GPS units, electronic book devices and readers, etc. may be used with the invention. The user device can be any long or short range electronic device used for voice or data communication over a network including base stations and cell sites.

End user devices 108 can communicate with service and application servers 104 and quarantine server 102 in any number of ways as known to those skilled in the art. For example, a user 110 with a smart phone user device 110a may connect to the Internet via a wireless 3G connection and run an application such as Google Maps for Mobile that provides a mobile application for viewing the user's location on a visually displayed map. Alternatively, the user device may wirelessly communicate with wireless hotspots to connect to the Internet and service and application servers 104.

The end user devices can be GPS-enabled to supply more precise user location data to the quarantine server 102 although they need not be GPS-enabled and location data can be derived from the user device's proximity to other objects in a known location, such as cell towers and WiFi hotspots. User location data may not only include geo-positioning coordinates such as latitude/longitude, but may also include additional location and travel information such as speed and heading if available.

End user devices use the services and applications provided by the service and application servers 104. They may contribute location data to the quarantine system 100 via these servers. They may also request location services, such as network-based location that uses network ID to determine a user's location.

In terms of identification of end user devices, as explained in more detail below, a client ID can be assigned to the end user device if not already in existence, and be attached in all communications from client (end user device) to the servers in location requests or location data uploads. Client ID may also expire and a replacement ID may be sent to the client during communications.

The quarantine system 100 can be a shared backend system for all services that receive user location information to facilitate the collection and storage of such information and to enforce the access control, security and anonymity assurance discussed herein while processing such data. For instance, the quarantine server 102 can serve as storage and processing backend for traffic/GPS server 106, which can provide real-time or updated traffic information to and from end user devices and collect user location information as samples for the user devices for the enrichment of traffic information to be served back to the community of user devices. Likewise, the quarantine server 102 can interact with one or more application servers 108 that can provide hosting services for the user devices, such as one or more web servers that accept HTTP requests from users running software such as web browsers, and then serve responses along with data content, such as web pages, map data, linked objects such as images, etc. to the user devices.

As described in more detail herein, detailed user location data is stored for a relatively short-lived period of time in the data quarantine server 102 and is then later scrubbed and moved to a filtered long-term data storage system 116, also referred to herein as long term, permanent or more permanent storage.

The quarantine server 102 provides a short-lived location data storage system, which is desirably well isolated from a long-term location database, and has very tight access control (typically only the components inside the quarantine system have direct access to this short-term location data storage to protect user location privacy). It enables a short interval over which more complete location information is preserved and available for internal data and security analysis and for sharing with other groups that use such information to provide better services to the user. After this interval expires, the information in the quarantine system is sanitized (including removing both spam and personally identifiable information) before moving to a long-term storage system.

Figure 2:
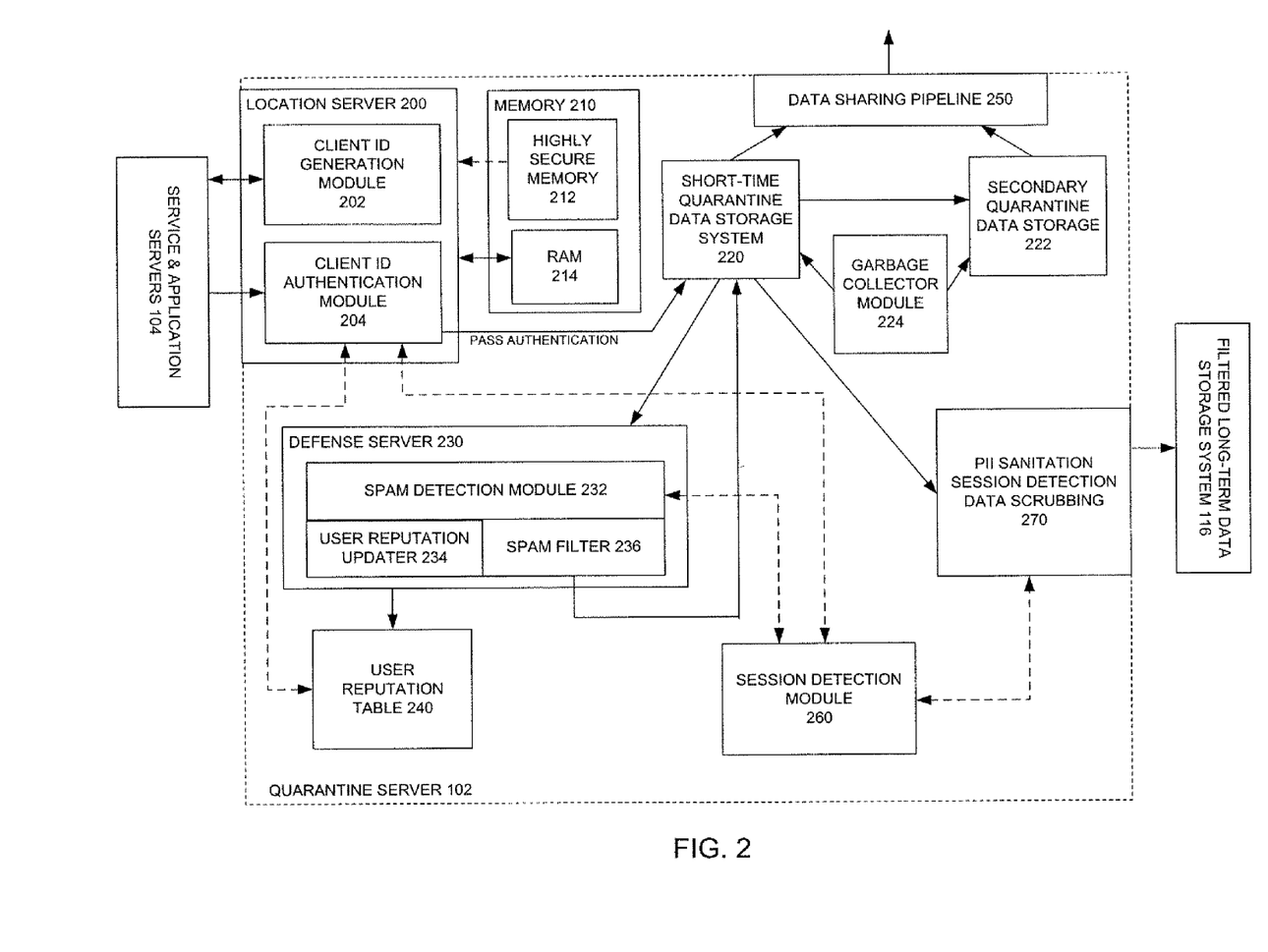
FIG. 2 is a functional block diagram of a quarantine server in accordance with an aspect of the invention.

Referring now to FIG. 2, a more detailed block diagram of quarantine server 102 is shown. Here, quarantine server 102 includes a location server 200, a short-term data quarantine data storage system 220 and a defense server 230.

Location Server

Location server 200 includes a Client ID generation module 202 and a client authentication module 204. These modules may be part of the software/hardware run by the server(s) at the location server 200 or may comprise one or more separate devices.

Client ID generation module 202 is used to generate masking Client IDs associated with each client request. Client IDs, including information that could be indicative of the user's identity, provide the essential building block for identification and authentication of the origin of location information to facilitate data and security analysis within the quarantine server 102. This sharing and usage of information while the user location data is in the quarantine server 102 is illustrated in FIG. 2, and includes accessing such data via data sharing pipeline 250, via which the user location data is passed for use and analysis by other modules and servers associated with quarantine server 102 and quarantine system 100, such as servers responsible for serving additional business applications to the user.

Generation and Verification of Client IDs

To generate a Client ID, a globally unique UID (User Identifier) is desirably created at the location server side. In one implementation, the UID comprises of a 64-bit random number, followed by a timestamp indicating the time when the Client ID is generated. Use of a unique 64-bit random number is desirable as it protects the user privacy and anonymity, since gaining access to the number and the timestamp provides an adversary virtually no knowledge about the user. Also, a large random number decreases the probability of collision; hence gaining access to one legitimate random number does not provide an adversary any knowledge about adjacent Client IDs generated around the same time. Of course, one of ordinary skill in the art can employ other forms of UID, such as using random numbers of different lengths or other formats of strings, or omitting the timestamp (if the generation time is of no interest to the systems), as long as it meets the requirements outlined above. Optionally, a version number can be included if multiple forms of the Client IDs coexist in the quarantine system.

Once the UID (User Identifier) is obtained, the UID is authenticated and encrypted to form the Client ID. The objective of the authentication and encryption is to prevent malicious attacks to the client services and applications by exploitation of the Client ID. One such attack, for example, is to forge large quantities of the Client IDs to cause strain on the system and degrade quality of service. Another attack could be to impersonate a legitimate user while attacking client services with the purpose of triggering denials of service to the victim.

There are many ways to authenticate and encrypt the UIDs. One possible solution is to use a keyed-Hash Message Authentication Code (HMAC) such as the HMAC-MD5 for authentication and AES (Advanced Encryption Standard) for encryption of the resulting HMAC. HMAC is a type of message authentication code calculated using an algorithm involving a cryptographic hash function in combination with a secret key. HMAC-SHA-1 is an alternative for authentication. Both keys used by the Client ID Generation module 202 for the above authentication and encryption purpose must be kept a secret to ensure the security of the quarantine system. One of ordinary skill in the art can also choose different authentication and encryption solutions with the cryptographic strength that meets the necessary security demands of the system.

The above generated Client ID will be sent by the location server 200 to the user device if the device has no prior Client ID or an expired Client ID. Subsequently, the Client ID will be attached to every location service request to the services and applications backed by the quarantine system 100, or attached to each location data collected by the quarantine system.

Upon receiving such service requests or data, the client authentication module 204 of the location server 200 will use the secret keys to decrypt the attached Client ID and verify (authenticate) the original HMAC inside the Client ID. Any requests and location data with invalid Client IDs will be denied with a response to notify the user device to obtain a new valid Client ID. The above mechanism ensures the integrity and authenticity of the Client IDs inside the quarantine server 102 so that it can be trusted and used for internal data and security analysis, which will be illustrated later. In an alternative implementation, the Client IDs can be sent over a secure channel such as SSL (Secure Socket Layer), TLS (Transport Layer Security), or HTTPS (Hypertext Transfer Protocol Secure), if the underlying communication channel between the user device and the server is deemed insecure.

Several additional measures can be applied to improve the security of the quarantine system. In one implementation, the secret keys can be generated from a master key and a random seed. The master key is desirably stored in a highly secure memory 212 that is only readable by the quarantine system at runtime and is inaccessible by the team that maintains the quarantine system. On the other hand, the random seeds can be stored in RAM (Random Access Memory) 214 that is only accessible by the team, which maintains the quarantine system. There are a number of advantages with this approach. First, no single authority or human has access to both the master key and the seed, or equivalently, no one has complete knowledge of the secret key to decipher the Client IDs except the quarantine system itself. Second, there is no permanent physical storage of the complete knowledge needed, because the seed is only maintained in the RAM 214 and will become irrecoverable if the seed is rewritten or if the host machine performs a hard reboot. In one possible implementation, the seed can be overwritten periodically to ensure that the old secret key is irrecoverable.

Another measure that can improve the security of the quarantine system is to not allow the Client IDs to be stored directly with any location data or other type of personally identifiable information. Instead, the Client IDs can be "hashed" such as by a secure hash function so that the user's identity is further shielded from other internal users of the system. For example, it is desirable for a reputation system that maintains individual user's reputation to use the original Client IDs so that the reputation can be maintained at a longer duration while the original IDs can be generated and assigned randomly so that it by itself does not expose the real identity of the user. However, if such an ID can be tied to a sequence of location data, over time there is a potential risk one could deduce the identity of the user from the location data and ultimately link the Client ID to a specific user. Thus, by applying the secure hash function to a Client ID and use of the secure hashed Client ID to store location data (or other personally identifiable information), the link from the potentially deducible user identity to the Client ID is obfuscated.

Additionally, the hash key for the above mentioned secure hash function can be maintained in RAM only and can be changed very frequently, for instance on a daily basis. Once the old hash key is replaced, all secure hash Client IDs become untraceable by the design of the secure hash function. The hashing function can be performed by the Client ID generation module 202. Of course, those of ordinary skill in the art can apply different kind of secure hash functions or encryptions to achieve the same goal, or adjust the hash key replacement with more or less frequency based on the security requirements of the quarantine system.

In addition, within the quarantine system, any data linked to the Client IDs and or the hashed Client IDs can be discarded following the quarantine interval. This quarantine interval policy can be achieved by setting an expiration limit to the above data, which can be stored for example in databases or tables. In one implementation, the data is deleted by a garbage collector module 224 which is a separate program that periodically (e.g., daily) wakes up and deletes the expired data accumulated in bulk since the last deletion. In this case, the expired data may remain in the system for an extended period (such as up to a day) until the garbage collector becomes active again. In another implementation, software can also be deployed to continuously delete the expired data entries for enhanced system security. Enforcing such a deletion policy using a uniform underlying infrastructure can be more reliable than using ad-hoc tools to manage different databases or tables.

Strict access control list (ACL) control can be provided on all the storage tables within the quarantine system. An ACL is a list of permissions attached to an object that specifies who or what is allowed to access the object and what operations are allowed to be performed on the object. Database ACLs can be defined appropriately to restrict access to sensitive data positions. Thus, an ACL can be used to strictly control and enforce who can access which quarantine table, and which positions of the table. The ACL changes can also be logged and available for audit later on.

An authenticated user/Client ID is useful in many scenarios. For example, in guarding against spam, it can be used in building a user reputation system, as described below. For anti-scraping measures, also discussed below, it enables more detailed analysis of fine granularity of rate limiting compared to other type of keys such as the application ID. Rate limiting is a technique applied to mitigate denial of service attacks on online services. The idea of rate limiting is to set a cap on the rate of request, for instance measured as number of requests per second, on each Client ID. Normal clients send requests well below the cap and therefore are not affected by such a cap, while scrapers are effectively blocked as they can no longer send scraping requests to the server at normally extremely higher rate.

However, as there may be privacy concerns about personally identifiable information, Client ID data, and even hashed Client ID data, must not be stored with user location information in permanent storage, and they are discarded upon expiration of the quarantine interval as we mentioned before.

Notwithstanding authentication of Client IDs discussed above, spammers may be able to keep on requesting new Client IDs, and first use some good data to build a good reputation of the newly acquired Client IDs in the quarantine system, and then start spamming. Thus, authentication by the client location data, offers stronger protection to the end user against such spam. The essence of authentication by the client location data is to evaluate the location data contributed by the client against a set of predefined rules according to the constraints of physics and a priori and posteriori knowledge of the specific application or domain where the client under scrutiny claims the data comes from.

For instance, a client that reports a location in Los Angeles and another location in New York in a half an hour later is likely not a legitimate client. This could happen, for example, if an impersonator is not aware of the real location of the victim, and hence is blindly contributing data that interleaves with and contradicts with the victim's correct location reports. If a client reports data over numerous locations say in the continental United States within a period of a week, that may certainly goes against a priori knowledge on the normal mobility patterns of majority of the users and therefore should be discarded.

A suspicion of a potential spam could also be raised where a cellphone client reports large amount of GPS location data within a particular neighborhood, but never once reports a cellular network ID within the same neighborhood, where on posteriori application knowledge is gained from many other clients who reported locations with the cellular network ID under question in the same neighborhood. A client could also report a GPS track that does not map to any known roads based on domain knowledge, which could trigger the discarding of such data if there is high confidence that the trail does not exist, or trigger a data analysis by comparing the data against recent satellite images for trail discovery if mapping services may have inadequate coverage near the locations reported by the client. Those of ordinary skill in the art can also exploit additional like-type constraints not mentioned here for authentication by client location data. The advantage of such authentication is clear. It can detect impersonation in case a legitimate Client ID of a victim user is stolen by the attacker and used to attack the system with the aim to hide its own trace, or harm the victim. Combining both authentications, the quarantine system is more resilient against the spammers as the decision to accept the newly contributed data by a client (user) does not solely depend on the past reputation of the client, but also the quality measure of the new data.

Those of ordinary skill in the art can apply general and domain specific knowledge about the quality measure on client location data to enforce authentication by the client location data. There may be some tradeoffs between the effectiveness of a specific implementation of the client location data authentication and its development and runtime costs. However, since the actual implementation of the authentication inside the quarantine system is typically hidden from the spammer, it raises the difficulty to the spammer substantially, as a spammer has to meet all potential constraints explained above to avoid being detected by the system, and hence not feasible or economical for the spammer in practical situations.

Many of the authentications by the client location data mechanisms can also be used for anti-spamming measures discussed below.

Data Analysis

Quarantine server 102 also can include a defense server 230 that includes a spam detection module 232, a user reputation updater module 234, a spam filter module 236 and a user reputation table 240 of users of the system storing data indicative of whether such a user is a reputable user or an unwanted user, such as spamming or scraping user/program.

Spam detection module 232 can implement different types of spam detection algorithms depending on whether the validation is done on individual data item, or based on correlation between different data items. Such different types of approaches can complement each other and co-exist. A first line of defense can be validating individual data items being submitted such as by examining the user location data being collected. For example, if a user device is in a vehicle, the spam detection module can examine the data being sent to make sure that the data submitted aligns with the road, or if the calculated speed from one position to the next is within reasonable range of driving speed.

In another example, if a user device is reporting WiFi access points with many GPS locations in the water, such as Lake Michigan, then these individual location data should all be dropped because either the data is spam, or the WiFi access point could possibly be in a cruise ship which is mostly mobile, and not useful as inputs to WiFi-based location technologies.

Spam filtering can also be based on inferences from correlation with existing data collection. For instance, statistical anomalies or other statistics can be used as spam signals. For example, clustering algorithms can be used to identify statistical outliers or spams. Neighborhood information can also be used to validate WiFi or cell ID location updates. For example, some devices falsely cache a WiFi access points seen in the past, and later send it to the server together with other newly found WiFi access points. If we are aware that they are currently not neighbors (based on physical location of the access points) from recent data collection by other clients, we should filter the above data as outliers. This can also be applied to both WiFi and Cell ID data collection. However, there may be different sets of heuristics or rules for WiFi and Cell ID data spam detection.

The user reputation table 240 can be used with client authentication module 204 to update or create user's reputation as a legitimate user or a spammer. Based on the decisions from the spam detection module 232, spam filter module 236 is used to filter spam data so that is not stored or used in short-term quarantine data storage system 220 or filtered long-term data storage system 116. Spam detection module 232 is also used with user reputation updater module 234 to update or create user's reputation as a legitimate user or a spammer.

The quarantine data is also useful in remapping detection, which detects changes to the cellular or other wireless networks, such as where a single or set of base stations (or access points) are reconfigured (such as assigned with new IDs, or moved), decommissioned, or added to the network, as described in U.S. patent application Ser. No. 12/324,407, which is hereby incorporated by reference herein.

The quarantine data is also useful for other business uses, such as for use in traffic applications providing the end user with information about traffic conditions.

Data Sharing

Data sharing pipeline 250 can provide access to data stored in short-term quarantine data storage and allow other internal users to use this data for various purposes, such as providing additional applications and information for the end user. It can also allow external access to processed data such as aggregated statistics after data analysis, but provide no personally identifiable information.

Session Detection Module

Quarantine server 102 also includes session detection module 260, which can be shared by the spam detection module 232, the data scrubbing module 270 and also possibly by the client authentication module 204. Session detection module 260 can provide mechanisms to detect smaller trips (or sessions) from a series of location data collected from the same user. By detecting the pace of change in location and time between adjacent data in the sequence, this module can detect the beginning, ending and intermediate stops of the entire trip. These turning points can be of particular privacy/anonymity concern to the user. For example, by overlaying the trajectory on a map, one can determine that the user started from a location and made a trip to a nearby grocery store and spent about half an hour there before returning to the original location. This is highly suggestive that the original location could be the user's home, and therefore could expose the user's true identity. By detecting these turning events, one can understand the high value data along a trip and therefore one can remove or permute the important data before storing such data permanently in order to protect user privacy and anonymity.

Data Scrubbing

As explained above, the quarantined data is stored in a relatively short interval in short-term quarantine data storage system 220, over which more complete location information is available. The short-term quarantine data storage system 220 can comprise any type of known storage system such as one or more severs, server hosts, databases, files, tables, etc. for storing data. After a predetermined interval where the shorter term storage expires, the information in the quarantine system is then "sanitized" or stripped of certain information, such as removing certain personally identifiable information by data scrubbing module 270, before moving the scrubbed data to filtered long-term data storage system 116.

In the short-term quarantine data storage system 220, it is desirable to have hashed Client ID stored together with user location data. Since the association between the hashed Client ID and user location data may raise privacy concerns, a short quarantine interval can be provided. After the quarantine interval, the hashed Client ID (which is still potentially personally identifiable information if stored permanently with the location data) is discarded.

A "two-knob" data quarantine approach can also be implemented where two separate quarantine tables are maintained, one for internal use, e.g., for spam detection, and a secondary quarantine table, such as at secondary quarantine data storage area 222, that re-hashes the key much more frequently than the internal quarantine table, e.g., the key is updated every 30 minutes.

The secondary quarantine table can be used to provide external users/entities direct access to the quarantine data, while at the same time mitigating privacy concerns by frequently changing hash IDs. Since the Client ID is hashed into different hash IDs across the quarantine interval boundaries, user location data correlation simply based on Client ID is restricted within a short quarantine interval.

As opposed to the original Client ID, a frequently re-hashed Client ID also helps to address the concern over any deletion/recovery concerns. However, the user of secondary quarantine table must act in accordance with the same security and privacy restraints as those enforced on users of the primary quarantine table. For example, they should not be allowed to copy data with the potential to compromise the user identity out of the quarantine system at any time.

The quarantined data can be maintained in a quarantine table that maintains a collection of data, e.g., Client ID, location data, and data spam score, discussed below. The data may also not be trusted (i.e., not used in the algorithm for location serving) until its associated user is designated as trusted. This approach can be more resilient to distributed spamming attacks.

A privacy goal achievable by an aspect of the invention is to avoid tracing back to a particular user from one destination to the other. This can be done by either breaking linkability of location "breadcrumbs" or data representing where the user has traveled to and from, and/or breaking the ability to locate the destinations. For example, the system can drop data at both ends of a user session. The end points of an identified user session are potential ends points of a user's trip. Alternatively or in addition, the other segments of user's session can be dropped, such as in a random fashion, so that the original track of the user is not easily recovered.

One approach is to drop end points of a user session. For short user sessions (e.g., with a cutoff threshold on the order of 500 meters), obfuscating may not be performed. For longer user sessions (e.g., longer than 500 meters), at least one point is desirably dropped from each end of a user session. How many more to drop at each end may be randomly selected. For Cell ID data, end points may be dropped based on the following rules. Cell towers may be categorized based on their popularity, e.g., number of points connected to a particular cell tower in the data collection. For instance, if a cell tower has more than a given number of points, e.g., 200 points, it can be considered as a popular cell tower; if a cell tower has less than a given number of points, e.g., 100 points, it can be considered as unpopular; otherwise, a cell tower in between can be considered as moderately popular.

The following logic would then apply. For popular cells, randomly drop points between the end point and 200 meters from the end point, so that the average drop distance is about 100 meters. For moderately popular cells (defined above), randomly drop points between the end point and 400 meters from the end point, so that the average drop distance is about 200 meters. For unpopular cells, drop the first end point, and randomly shift the next few end points under the constraint that the centroid of the remaining points after the shifting remains approximately the same as the original points before shifting.

The length of the segment over which dropping and shifting may be approximately 400 meters. Since there is more limited data collection in unpopular cells, every data point can be important; therefore, a combination of drop and shifts can be applied instead of a simple drop approach. One of ordinary skill in the art can also choose to adjust all the aforementioned parameters, and or employ a subset of the described scrubbing logic so long as it meets the specific requirements of desired user location privacy and anonymity protection.

For WiFi data, if it is sent together with the cell ID data, the same drop decision can be used as the cell ID data. In this way, one cannot combine cell ID database and WiFi database to derive more information than any single database alone.

For WiFi data alone (i.e., data without accompanying Cell ID data), it can be treated as if the data comes from popular cells, since most WiFi access points are located in popular metropolitan areas.

For non-GPS (e.g., map center) data, the same policy as GPS data can be used. A map center is the center location of the viewable portion of the map displayed in the user device's screen. Even though map center may not necessarily reflect a user's true location to the same extent as GPS data, the same policy as GPS data can be used to be consistent.

Other approaches can also be used to preserve location information and obfuscate the user location data's timestamp. Thus, in one approach, for each data point, the location information can be kept intact and time shifting can be applied to the time stamps. Each time stamp can be randomly shifted to a different time within the same day, same week or even larger time interval depending on the desired level of obfuscation.

Data points can be time-shifted independently for each cell and each user session. Temporally clustered points belonging to the same user can be considered as one user session. Since data points are shifted independently for each cell, this can help break any linkage along a user track as long as the user travels across more than a single cell.

Time shifting to all data points in the same user session and the same cell can be applied as follows. Each day is divided into 48 30-minute slots, and each user session is randomly slotted into one of them. The beginning of the user session is aligned with the beginning of the 30-minute slot. The relative order and temporal distance among points within the same user session is maintained. In rare cases where a user session is more than half an hour long, the user session is overflown to the next slot. Since most user sessions are less than half an hour, this random slotting strategy can minimize the overlap between different user sessions.

Compared to continuous-time random shifting (i.e., having a random start point), having a fixed start point and discrete slot can help to minimize the overlap between different user sessions, which is a desirable property for many different data analysis and applications, such as remap detection and clustering algorithms. Thus, each user session will do independent random slotting within the same day as its original stamp is maintained. Thus, the relative order of the data points inside the user sessions can be maintained. One of ordinary skill in the art can also adjust the per slot duration (e.g., one-hour slot), or the time range within which a session is allowed to shift randomly (e.g., shifting within a week period instead of days) as long as the parameters meet the requirements of the data analysis and applications running on the shifted data.

Figure 4:
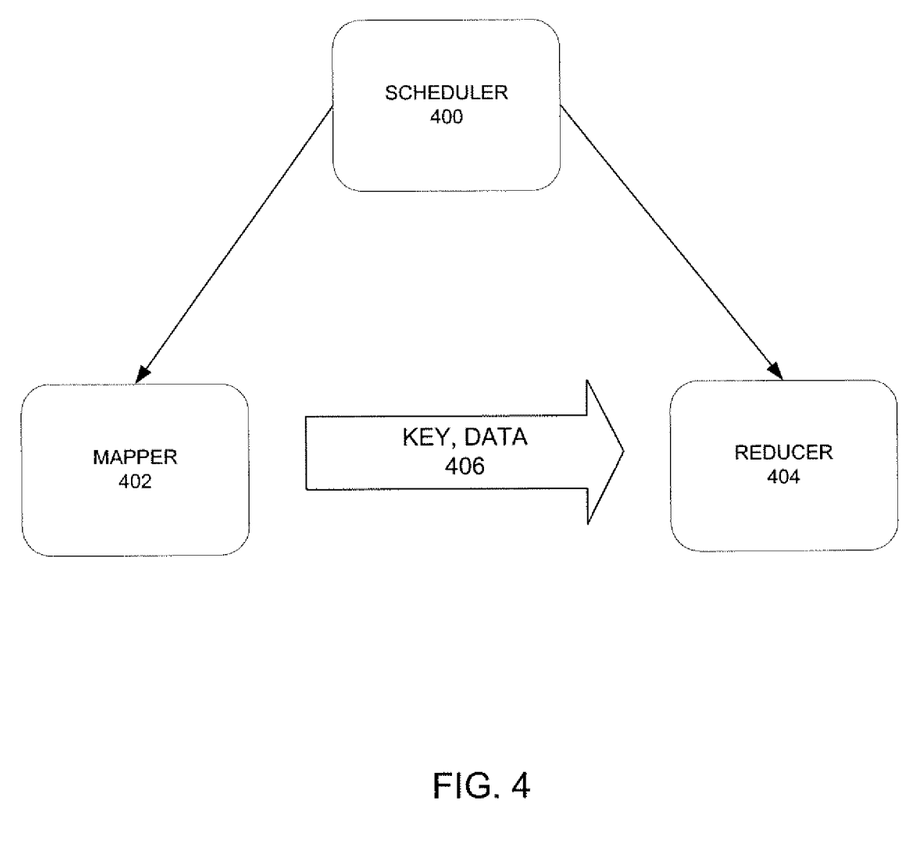
FIG. 4 a flow chart showing an implementation of the logic used by a defense server in accordance with an aspect of the invention.

The reducer module 404 periodically scans the quarantine table, finds data that is going to expire soon based on the set lifespan of data inside the quarantine table. To identify user sessions, the quarantine table is indexed by Client IDs. For each Client ID, among all to-be-expired data points, user sessions are identified. This can be done as follows.

Temporal clustered points belonging to the same session, e.g., all data points within the same day and less than 5 minutes apart from each other, are considered as belonging to the same user session. The time shifting can then be applied. To do so, for a given user session, generate a random number "i" between 0-47, which is the index of the 30-minute slot, then shift the identified user session to the i-th slot, and align the start point of the user session to the start of the slot. Then apply the same time shift to all data points in this user session. For each data points (with the original location intact and the obfuscated timestamp), write to cell ID table or/and WiFi table. Initially, for data that does not have a Client ID, directly save to Cell ID and WiFi table. Data without Client IDs can be treated separately, e.g., given a low weight or discarded completely.

Alternatively, for popular cell towers, one can change from discrete randomization (randomized into one of 48 slots) to continuous randomization within the same day (or other appropriate time interval). For unpopular cell towers, one can change the randomization window to from now tracing back to the most recent point in the same cell tower, which tends to enlarge the randomization window and increase the level of obfuscation.

In addition, after the time shifting, and before writing a data point back to the main database, the data obscuring algorithm can first read from the main database to see whether there is existing data with the same timestamp. If so, it can fine-tune the timestamp (e.g., adding one ms) to avoid overwriting data with the same timestamp, and save it to the main database.

The relative order of different user sessions in the same day may also be reversed, which could have slight negative impact to applications that determines or utilizes the exact time associated with the occurrence of an event, such as remap detection. For example, if remapping happens say in the middle of a day, then the data before the remap and after the remap may be reversed, and therefore remap detection may need an extra day in response time. Also, in cases of cell towers that have uneven data distribution among different days of a week, extra time may be needed to respond to remapping events.

All applications, such as the remap detection algorithm can be modified to leverage both data inside the data quarantine table and the data in filtered data storage.

The filtering algorithm, as part of the clustering algorithm, desirably applies on the long-term data. However, it can be moved to run as a spam filter in the quarantine system, which would have access to data with original timestamps.

Location scrubbing can also be performed based on duration of user sessions. For example, for short user sessions (e.g., a cutoff threshold could be 500 meters), there may not be scrubbing since most short user sessions do not correspond to a complete user trip. For longer user sessions (e.g., longer than 500 meters), the end-user system could drop at least one point from each end of a user session, and then randomly drop additional points.

The aforementioned scrubbing technique is just one example of trading user privacy with the business utility. Other scrubbing algorithms can also be used to obfuscate personally identifiable information, such as timestamp scrubbing (i.e., deleting when the user was at a given location), which may preserve more location data but may expose users to more of a linkability risk.

Anti-Spamming

Anti-spamming measures can be implemented with or independently of various embodiments of the data quarantine system. Namely, by using personally identifiable information such as Client ID before it is stripped and sent to longer-term storage, the spam detection module 232 of defense server 230 can more easily identify data coming from a single user, which allows the system to build a user reputation database for spam detection. Identification of an unauthorized user or program of the system can place such a person/program, and/or the user's domain, on a "blacklist" based on analysis that occurs while the user location data is in the quarantine system.

In this manner, once a person or domain is identified and tagged as unauthorized, that person's location data can still be sanitized before moving it to the long term storage system, which can use the sanitized data for other analysis such as cell ID and WiFi localization and mapping based on anonymous user data. However, the location data associated with an unauthorized person or domain is often entirely dropped by the sanitization routine because most unsophisticated spammers do not contribute good or usable data. Such sanitization improves data integrity and, consequently, the localization quality.

As described above, for data collection, data can be deemed as not trusted (i.e., not used in the algorithms for location serving) until its associated user is trusted. Such a trusted model is therefore more resilient to distributed spamming attacks.

When a user uploads data, the location data is sent together with a Client ID (or hashed Client ID) to the data quarantine server 102. When a client location update arrives at the location server 200, it is first put into short-term quarantine data storage system 220, such as in a quarantine table that stores the data in table or matrix format.

The short-term quarantine data storage system 220 serves a dual purpose. First, data in the short-term quarantine data storage system 220 is sanitized before moving to the filtered long-term storage system 116 and thus it delays data from being reflected in location data serving pipeline. Second, the short-term quarantine data storage system 220 isolates any potentially personally identifiable information inside the quarantine region. As personally identifiable information is available within the quarantine period, it can be used in a controlled manner consistent with a set privacy policy.

For example, the data stored in data quarantine region may be stored there for a period of days, such as seven days or even for a period of hours, such as four hours, during which time is can be accessible for internal or external use. After the storage period is over, the data is then deleted to enhance privacy of personally identifiable information.

In addition to Client ID, a spam score may also be generated that is associated with each user location update, such as when a change in the user's location is provided to the location server.

An example of the data flow of a location update request (i.e., user equipment asks the location server for its position, or uploads its current position to the location server if the position is already known to the user equipment via alternative location technologies such as an onboard GPS) is as follows. First, a new location update reaches one or more of the service and application servers 104 from a user device 110a, 111a or 112a or an access point 112b. The application server being used then relays the location update request to quarantine server 102. The location update request first reaches client authentication module 204 of location server 200. If authentication fails, the location update request is dropped; otherwise, the location update request is passed to the short-term quarantine data storage system 220.

Once the location update is saved in the short-term quarantine data storage system 220, the normal work flow of the location update reply continues. The spam detection module 230 and spam filter module 236 of the defense server 230 run spam detection algorithms over the data in the short-term quarantine data storage system 220. The result from the spam detection algorithms is then used to rate data in the short-term quarantine data storage system 220. Trusted data is moved from the short-term quarantine data storage system 220 to filtered long-term storage system 116 and nontrusted data is discarded. Further, user reputation updater module 234 is then used to update the user reputation score stored in the user reputation table 240.

Figure 3:
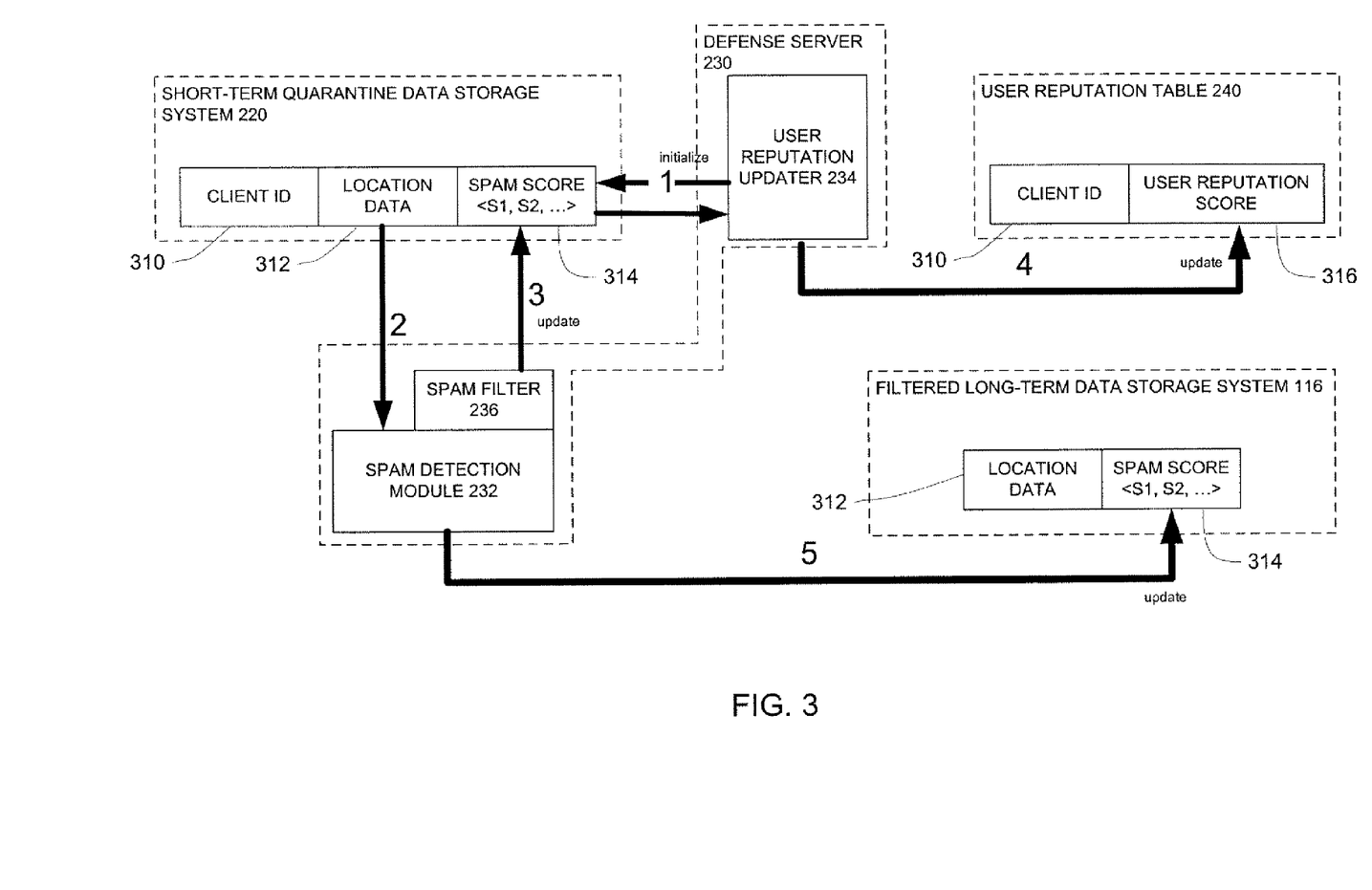
FIG. 3 is data flow diagram of various data used in the location data quarantine system in accordance with an aspect of the invention.

Referring to FIG. 3, Client ID information 310 can be used in the spam detection and user reputation update algorithms. The spam detection algorithm or algorithms used can leverage all available data including Client ID 310 and location data 312 while it is residing in the short-term quarantine data storage system 220.

A flow chart of the updating of spam scores and user reputation score is shown in FIG. 3. First, the spam score 314 is initialized (step 1). Upon detecting spam via the spam detection module 232 (step 2), the spam filter 236 will update the spam score 314 (step 3) corresponding to the detected spam data. At the end of the quarantine interval, the spam score 314 of location data 312 is used by the user reputation updater module 232 to update the user reputation score 316 (step 4) associated with the Client ID. The spam score is then moved with the location data from the short-term quarantine data storage system 220 to the filtered long-term data storage system 116 (step 5) and the Client ID is discarded such that no personally identifiable information will exist in longer term storage. Additional data may also be dropped or permuted by the data scrubbing module 270 when the data is moved out of the quarantine to the filtered long-term data storage system as previously discussed.

User reputation scores 316 and data spam scores 314 are therefore used as bi-directional feedbacks to each other. Thus, upon detecting spams, the spam filter 236 updates the data spam score 314 (step 3) and data spam score 314 is in turn used to update its associated user reputation score 316 (step 4).

Anti-Scraping

Aspects of the invention also can incorporate anti-scraping measures including those anti-scraping measures described below. The anti-scraping measures described herein can also be used independently of the data quarantine system. Data scraping typically occurs when computers, rather than people, visit websites and automatically collect data intended for an end-user, rather than as input to another program. Scraping is often unwanted, as it increases system load and loss of control of the information content.

End-user systems, such as used by Google, Inc.'s My Location, which provides a global location platform across different device platforms and carriers in the industry, include large location databases and thus becoming a target for scraping. In the past, anti-scraping efforts mostly relied on human intervention to spot trends and unauthorized access to the database information by dedicated developers conducting data mining, deriving defense policies, and manually pushing to the location server to block the scrapers.

With one aspect of the invention, the defense server 230 can be used to analyze the user queries stored in the quarantine system, and provide real time defense feedback to the quarantine server 102. The defense server 230 automates previous manual monitoring, detection and defense mechanisms thereby relieving human developers and administrators from constantly being on alert for scrapers.

Use of the defense server can also shorten the detection delay, for example from days to minutes, and therefore and locate and block scrapers much earlier before a significant portion of the location database is in jeopardy.

Each request or query received by defense server 230 may include an IP address, WiFi or cell ID signals, client ID, and/or various other user attributes. The IP address may refer to the client's or its proxy's IP address. Attackers may try to disguise or spoof this information. However, it may be difficult to manipulate an IP address, WiFi or cell ID signals, and client ID. For example, the IP address plays an important role in routing, so if a request is associated with spoofed IP address, the system may not be able to route the requested information back to the requestor. In addition, WIFI and cell ID signals may be identified in a request. Finally, if the user does not have access to the master key, random seed, or hash key, the device will be unable to generate a legitimate client key.

User attributes may include a device identifier, application name, user agent, carrier name, and radio type. "Device" may refer to the brand and/or model of the client device. "Application" may refer to the identity or type of application running on the user device which sends the request. A "UserAgent" may be a string which uniquely identifies a web browser and its version number. "CarrierName" may include a string or numerical identifier or a combination of identifiers that globally uniquely identify the mobile network operator. "RadioType" may indicate the type of network, for example, GSM or CDMA, which the device is accessing. Accordingly, each request may include a combination vector including, for example, one or more elements in the set [Device A1, Application B1, UserAgent C1, CarrierName D1, RadioType E1].

Defense server 230 may maintain a database of valid and invalid combination vectors. The database may contain various unlikely or impossible vector combinations. For example, some mobile network operators may not support a specific device. In another example, a device may not support a given application. If a combination vector has not been received in the past or if the combination vector is impossible or unlikely, defense server 230 may use this information to identify spammers or scrapers.

In addition, the defense server 230 can analyze other signals to provide flexibility in defending against scrapers with different attacking signatures. Thus, the defense server can protect multiple scraping targets, such as cell ID (e.g., location of cell tower) and WiFi access points.

The defense server 230 can run various consistency checks by software running on the server, including running consistency checks within a single user query. For example, a user query may include both WiFi signals and cell ID signals; however, if the locations derived from the cell tower signal are dramatically different from locations derived from the WiFi access point signals, defense server data can use this discrepancy to indicate a spammer or scraper.

If a request for information regarding a WiFi signal or cell ID is legitimate, the location of the user's source IP address should be consistent with the location of the target WiFi signal or cell ID. Defense server 230 may the context of the request to determine whether the requestor is a spammer or scraper. For example, a scraper with a high-speed internet connection may want to scrape information that is not proximate to the scraper's network. The scraper may request the geographic location of a cell ID that is not proximate to the geographical area associated with the scraper's IP address.

The defense server 230 can also perform consistency checks across user queries and even across different signal vectors. For example, the defense server can derive or analyze user speed based on queries sent by a single user. If the user speed is beyond a given reasonable range for a user, this may indicate a scraper or spammer.

The defense server 230 can also check whether consecutive user queries sent to the location server 102 align well with existing road vector data (e.g., whether the user is positioned along a road or scattered around in typically inaccessible regions), which could also be used as a signal to detect scrapers.

The defense server 230 can check data consistency across queries submitted by multiple users, for example, whether data on a particular cell tower or WiFi access point submitted by all users agree with each other.

The defense server 230 can also use history data to build benchmarks on what is considered "normal" use. For example, historical data can be used to derive what is a "normal" temporal pattern of similar queries, "QPS" (queries per second) or failure rate for a particular IP address/domain, which can be used as benchmarks to compare with current traffic to detect anomalies to identify potential scrapers.

A scraper's temporal request may not comply with the temporal pattern of legitimate requests. For example, if cell ID A is located within a metropolitan area, legitimate requests may be more likely to occur during the day time or early evening hours. In this case, if a large number of requests are received at midnight local time, these requests are more likely to come from scrapers, which may or may not be located in the same time zone as cell ID A.

Defense server 230 may monitor access patterns or geographic distributions associated with valid combination vectors of user requests. For example, combination vectors associated with legitimate users may have general access patterns, for example, QPS, failure rates, or some geographic distribution of a requested cell ID or WiFi location. Geographic distribution may refer to the fact that requests with a particular combination vector may only originate from particular areas. In addition, a combination vector may also have certain specific temporal patters, for example, a request frequency.

Past history data may also be used to construct a "whitelist" of authorized users that could be stored in user reputation table 240 to help prevent the end-user system from accidentally blocking legitimate users. In addition, history data may be used to derive thresholds used to trigger scraper detection. Given dynamic nature of the mobile user traffic, the user reputation system desirably continuously monitors the history across different dimensions and adjusts and adapts benchmarks and white-lists to evolving traffic dynamics.

Many of the above defenses may be used independently or in combination to prevent scraping attacks. For example, the system may rely on geographical and temporal signals to determine whether a query or request is a scraping attack.

Once a spammer or scraper has been identified, defense server 230 may calculate a general fingerprint of the attacker. The general fingerprint may include all or less than all of the aforementioned attributes of the request, for example a combination of temporal, geographical, and combination vectors.

Defense server 230 may use the general fingerprint to defend against future attacks. Some scrapers may attempt to modify the values of the combination vector or utilize a different temporal pattern while at the same time using the same computer program that generated the initial request. Defense server 230 may compare a new request to the general fingerprints to determine if there is a sufficient match and the request should be identified as an attack. Accordingly, this system may be used to identify repeat attackers as well as new attackers that use similar patterns.

A flow chart showing an implementation of logic used by the defense server 230 is shown in FIG. 4. Namely, the defense server can run a schedule module 400, a mapper module 402, and a reducer module 404. Scheduler module 400 sets up the mapper and reducer modules. It also periodically runs a task to detect scrapers and sends e-mail to alert the maintainers of the system about the presence of the scrapers and to take follow up actions to block the scrapers. One of ordinary skill in the art understanding the previously described functionality and logic of defense server 230 could also choose a different implementation other than the flow chart shown in FIG. 4.

The mapper module 402 and reduced module 404 are discussed in more detail in the paper "MapReduce: Simplified Data Processing on Large Clusters" by Jeffrey Dean and Sanjay Ghemawat, OSDI'04: Sixth Symposium on Operating System Design and Implementation, San Francisco, Calif., December, 2004, and which is incorporated by reference herein.

MapReduce is a programming model and an associated implementation for processing and generating large data sets. Users specify a map function that processes a key/value pair to generate a set of intermediate key/value pairs, and a reduce function that merges all intermediate values associated with the same intermediate key. Many real world tasks are expressible in this model, as shown in the paper.

Mapper 402 reads data from a table and regroups the data based on the specified signal key such as IP or Platform. The key and data 406 is then sent to the reducer module 404, which computes statistics, compares it with a present threshold, and triggers scraper detection. If a scraper is detected, the scraper is then logged by the reducer module. The modules 400, 402 and 404 can be implemented by software running on one or more processors of one or more computers that form the defense server.

The data sent by the mapper module 402 to the reducer module 404 includes the user's request for location data and the system's reply back to the user. By default, the mapper module 402 can read data from the IP table where request and reply can be wrapped in a single protocol buffer, and may be saved in a single column of a spreadsheet or database. Protocol buffers are desirably a flexible, efficient, automated mechanism for serializing structured data similar to XML, but can be smaller, faster, and simpler. One can define how one wants the data to be structured once, then one can use special generated source code to easily write and read structured data to and from a variety of data streams and using a variety of languages. One can update the data structure without breaking deployed programs that are compiled against the "old" format. The mapper module 402, however, could also read data directly from the quarantine table, where the request and reply can be saved in separate columns.

The following program logic illustrates one possible way to trigger scraper detection where a return value of true indicates a scraper suspect is detected:

```
if
(activeQpsInUniqueKeys<lowQpsInUniqueKeysThreshold
    ||totalUniqueKeys<lowTotalUniqueKeysThreshold)
        {return false;
    }
    if (failureRatioInUniqueKeys>
    highFailureRatioUniqueKeyThreshold) {return true;
    }
    if
((activeQpsInUniqueKeys*failureRatioInUniqueKeys)>
    highFailureQpsInUniqueKeysThreshold) {return true;
    }
    return false;
```

The defense server can also be started with a different signal type, such as "Carrier". In a default setting, the defense server can analyze the data based on the IP signal and Cell ID information, assuming that the scraper is trying to scrape Cell ID information.

Three databases can be used in the system that can be accessed (both read and write) from multiple servers. The first database associated with user reputation is the user reputation table 240, which includes Client ID and user rating scores. The user reputation database has personally identifiable information (Client ID), but no location information. The second database is the short-term quarantine data location system 220. It includes a collection of Client ID, data, data spam score, and spam filter state vector (discussed below). The third database is the filtered long-term data storage system database, which includes location data and data spam score. All three databases can be stored in one large table location or main database.

The one large table schema for each database can be used as follows. User ratings: keyed on Client ID; column value is user rating score. Quarantine location database: keyed on Client ID; column value includes location data, data spam score, and filter state vector. (Spam filter state vector is a bit vector. A spam algorithm runs as a spam filter, and corresponds to one bit in the filter state bit vector. A bit being set indicates whether its corresponding spam filter has been applied or not.)

For example, for a data entry newly submitted to the short-term quarantine data storage region, its spam score is initialized with the corresponding client's user spam rating, and the filter state vector is initialized to zero. After applying a spam filter to a data item, its corresponding bit in the filter state vector is set to be 1; as a result, its data spam score may also be updated. After all available spam filters having been applied to a data item, its data spam score can be used to update its corresponding client's user rating score. Client ID can be the row key to facilitate client session analysis, and spam analysis.

While a separate defense server 2304 can be employed, it can also be incorporated into or distributed across other servers or computers in, or in communication with, quarantine server 102.

Aspects of the invention allow end-user systems, such as the My Location used by Google, Inc. to support main services of WiFi and Cell ID localization, that is, the mapping of WiFi and cell tower locations to provide better services for end-users. Namely, with user location information about where a user is traveling such as from one cell tower to the next as compared to GPS data from the same user, more detailed mapping information can be provided such that users without access to GPS can be provided with mapping information based on proximity to cell towers based on data collected and analyzed by the system.

Other aspects of the invention also allows for data sharing with other aspects of the end-user system, such as servers involved with services such as traffic, search quality, and IP geolocation (e.g., using IP address to determine a user's geographic latitude, longitude and, by inference, city, region and nation by comparing the user's public Internet IP address with known locations of other electronically neighboring servers and routers).

Still other aspects of the invention also assists in the generation of public "heatmaps" of user locations, such as graphical representations of user location data where the values taken by a variable in a two-dimensional map are represented as colors.

When moving data from the short-time quarantine data storage system 220 to the filtered long-term data storage system 116, data scrubbing is performed, such as removal of the Client ID. User privacy can still be protected, while at the same time anonymous data can be used to further process information by the system, such as by performing clustering, as described in U.S. patent application Ser. No. 12/323,921, which is hereby incorporated by reference herein, and remapping.

In any event, the quarantine system of the invention may allow easy refinement the location data scrubbing algorithms to adjust the tradeoffs between user privacy and business utility.

Of course, the invention can also allow removal of other standard personally identifiable information fields such as Client ID and IP address. In addition, the scrubbing process can also remove some of the more obscure data fields. For example, for sparse user population platforms, one may be able to identify a user uniquely based on the platform name, which can then be scrubbed.

Figure 5:
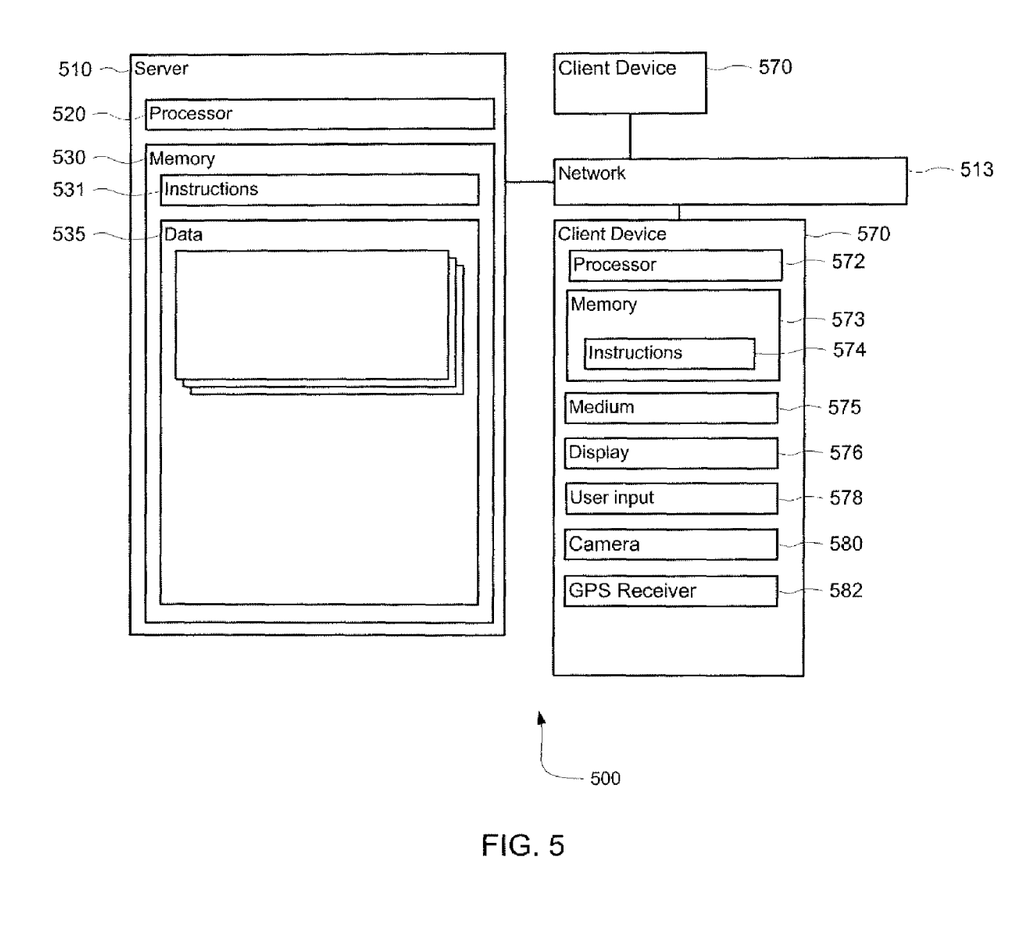
FIG. 5 is a block diagram of a server and user devices used in accordance with aspects of the invention.

Referring to FIG. 5, the servers discussed above may comprise one or more server computers, such as server 510 containing one or more processors 520, memory 530 and other components typically present in general purpose computers. The computer memory can store information accessible by the processors, including instructions 431 that may be executed by the processor(s). The computers also can store and/or gain access to data 535 that may be retrieved, manipulated or stored by the processors. The memories may be of any type capable of storing information accessible by the processors, including a computer-readable medium such as a hard-drive, memory card, ROM, RAM, DVD, CD-ROM or other optical disks, as well as other write-capable and read-only memories. The processors may be any processor, such as processors from Intel Corporation or AMD. Alternatively, the processors may be dedicated controllers such as ASICs.

The instructions implemented by the processors may be any set of instructions to be executed directly (such as machine code) or indirectly (such as scripts) by the processor. For example, the instructions may be stored as computer code on the computer-readable medium. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The data used in the short-term quarantine data storage system 220, filtered long-term data storage system 116, etc. may be retrieved, stored or modified by the computer processors in accordance with instructions. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable CD-ROM, an external device, a network device, and others within a read-only computer chip. Some or all of the instructions and data may be stored in a location physically remote from, yet still accessible by, the processor. Accordingly, references to a processor or computer will be understood to include references to a collection of processors or computers that may or may not operate in parallel.

The computers may be at one node of a network 495 and capable of directly and indirectly communicating with other nodes of the network. For example, location server 102 may comprise a web server that is capable of communicating with client devices 110a, 111a via network 113.

The network and any intervening nodes, may comprise various configurations and protocols including the Internet, World Wide Web, intranets, virtual private networks, wide area networks, local networks, private networks using communication protocols proprietary to one or more companies, Internet relay chat channels (IRC), instant messaging, simple mail transfer protocols (SMTP), Ethernet, WiFi and HTTP, and various combinations of the foregoing. Although only a few computers are depicted in the figures, it should be appreciated that a typical system can include a large number of connected computers, with each different computer being at a different node of the network. Moreover, as noted above, servers and the other devices may comprise collections of devices/servers at multiple nodes of the network.

Each user device, represented by user device 570 (corresponding to user devices 110a, 111a and 112a of FIG. 1), may be configured with a processor 572, memory 573 and instructions 574. Each user device may be or have the characteristics of a personal computer, intended for use by a person having all the internal components normally found in a personal computer such as a central processing unit (CPU), display device 576 (for example, a monitor having a screen, a projector, a touch-screen, a small LCD screen, a television, or another device such as an electrical device that is operable to display information processed by the processor), a computer-readable medium 575 (for example, a CD-ROM, hard-drive, RAM or ROM), user input 578 (for example, a mouse, keyboard, touch-screen or microphone), a camera 580, a GPS receiver 582 and other I/O devices such as speakers, modems and/or network interface devices (telephone, cable or otherwise) and all of the components used for connecting these elements to one another.

Moreover, computers and user devices in accordance with the systems and methods described herein may comprise any device capable of processing instructions and transmitting data to and from humans and other computers including general purpose computers, PDAs, mobile devices, network computers lacking local storage capability, and set-top boxes for televisions.

Although certain advantages are obtained when information is transmitted or received as noted above, other aspects of the system and method are not limited to any particular manner of transmission of information. For example, in some aspects, user location information may be sent via a medium such as hardwire, disk, tape, a solid state device or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Thus, use of aspects of the invention provides a flexible framework that allows the system to balance user privacy with business utility, and has the flexibly to adjust the tradeoffs between them. Anti-spamming measures and anti-scraping measures can be employed with the invention as explained below. Inside the quarantine system, more complete information is available for analysis and for enabling numerous business utility applications.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A computer-implemented method of quarantining user location information, comprising:
   generating, for a client device, an client ID including encrypted globally unique identifier;
   receiving the client ID and an associated location;
   in response to receiving the client ID and the associated location, identifying a first key for hashing the client ID;
   hashing, by a processor, the client ID using the first key to generate a secure hashed client ID;
   storing the secure hashed client ID and the associated location in a quarantine table associated with an expiration period for secure client IDs stored in the quarantine table;
   after a predetermined period of time associated with the quarantine table, replacing the first key with a second key;
   after generating the secure hashed client ID, but before the expiration period has expired for the secure hashed client ID, receiving the client ID and a second associated location;
   in response to receiving the client ID and the second associated location, identifying the second key for hashing the client ID;
   hashing the client ID using the second key to generate a second secure hashed client ID;
   storing the second secure hashed client ID and the second associated location in the first quarantine table;
   once the expiration period has expired for the secured hashed client ID, storing the associated location in long term memory without either of the client ID or the secured hashed client ID;
   in response to receiving the client ID and the associated location, identifying a third key for hashing the client ID;
   hashing the client ID using the third key to generate a third secure hashed client ID; and
   storing the third secure hashed client ID and the associated location in a second quarantine table different from the quarantine table.

2. The method of claim 1, further comprising once the expiration period has expired for the second secured hashed client ID, storing the second associated location in long term memory without either of the client ID and the second secured hashed client ID.

3. The method of claim 1, wherein the globally unique identifier is a random number.

4. The method of claim 1, wherein the client ID includes a timestamp, and the method further comprises rejecting a request including the client ID where the timestamp indicates that the client ID has expired.

5. The method of claim 1, further comprising:
   after a second predetermined period of time associated with the second quarantine table, shorter than the predetermined period of time, replacing the third key with a fourth key;
   in response to receiving the client ID and the second associated location, identifying the third key for hashing the client ID;
   hashing the client ID using the third key to generate a fourth secure hashed client ID; and
   storing the fourth secure hashed client ID and the second associated location in the second quarantine table.

6. The method of claim 1, further comprising:
   analyzing the associated location in the quarantine table before for the secure hashed client ID for spam potential;
   analyzing the second associated location in the quarantine table before the expiration for the second secure hashed client ID for spam potential; and
   allowing the client device to access the associated location and the second associated location in the second quarantine table.

7. A system comprising:
   a quarantine table having an expiration period for secure client IDs and a key value;
   long term memory for storing locations;
   a processor configured to:

generate, for a client device, client ID including encrypted globally unique identifier;
receive the client ID and an associated location;
in response to receiving the client ID and the associated location, identifying a first key for hashing the client ID;
hash the client ID using the key value to generate a secure hashed client ID;
store the secure hashed client ID and the associated location in the quarantine table;
after a predetermined period of time associated with the quarantine table, replace the key value with a second key value;
after generating the secure hashed client ID, but before the expiration period has expired for the secure hashed client ID, receive the client ID and a second associated location;
in response to receiving the client ID and the second associated location, identify the second key value for hashing the client ID;
hash the client ID using the second key value to generate a second secure hashed client ID;
store the second secure hashed client ID and the second associated location in the first quarantine table;
once the expiration period has expired for the secured hashed client ID, storing the associated location in the long term memory without either of the client ID or the secured hashed client ID;
in response to receiving the client ID and the associated location, identify a third key value for hashing the client ID;
hash the client ID using the third key value to generate a third secure hashed client ID; and
store the third secure hashed client ID and the associated location in a second quarantine table different from the quarantine table.

8. The system of claim 7, wherein the processor is further configured to once the expiration period has expired for the second secured hashed client ID, store the second associated location in the long term memory without either of the client ID and the second secured hashed client ID.

9. The system of claim 7, wherein the globally unique identifier is a random number.

10. The system of claim 7, wherein the client ID includes a timestamp, and the processor is further configured to rejecting a request including the client ID where the timestamp indicates that the client ID has expired.

11. The system of claim 7, wherein the processor is further configured to:
after a second predetermined period of time associated with the second quarantine table, shorter than the predetermined period of time, replacing the third key value with a fourth key value;
hashing the client ID using the third key value to generate a fourth secure hashed client ID; and
storing the fourth secure hashed client ID and the second associated location in the second quarantine table.

12. The system of claim 7, wherein the processor is further configured to:
analyze the associated location in the quarantine table before for the secure hashed client ID for spam potential;
analyze the second associated location in the quarantine table before the expiration for the second secure hashed client ID for spam potential; and
allow the client device to access the associated location and the second associated location in the second quarantine table.

13. A non-transitory, tangible computer-readable storage medium on which computer readable instructions of a program are stored, the instructions, when executed by a processor, cause the processor to perform a method, the method comprising:
in response to receiving the client ID and the associated location, identifying a first key for hashing the client ID;
hashing, by a processor, the client ID using the first key to generate a secure hashed client ID;
storing the secure hashed client ID and the associated location in a quarantine table associated with an expiration period for secure client IDs stored in the quarantine table;
after a predetermined period of time associated with the quarantine table, replacing the first key with a second key;
after generating the secure hashed client ID, but before the expiration period has expired for the secure hashed client ID, receiving the client ID and a second associated location;
in response to receiving the client ID and the second associated location, identifying the second key for hashing the client ID;
hashing the client ID using the second key to generate a second secure hashed client ID;
storing the second secure hashed client ID and the second associated location in the first quarantine table;
once the expiration period has expired for the secured hashed client ID, storing the associated location in long term memory without either of the client ID or the secured hashed client ID;
in response to receiving the client ID and the associated location, identifying a third key for hashing the client ID;
hashing the client ID using the third key to generate a third secure hashed client ID; and
storing the third secure hashed client ID and the associated location in a second quarantine table different from the quarantine table.

14. The medium of claim 13, wherein the method further comprises:
after a second predetermined period of time associated with the second quarantine table, shorter than the predetermined period of time, replacing the third key with a fourth key;
in response to receiving the client ID and the second associated location, identifying the third key for hashing the client ID;
hashing the client ID using the third key to generate a fourth secure hashed client ID; and
storing the fourth secure hashed client ID and the second associated location in the second quarantine table.

15. The medium of claim 13, wherein the method further comprises:
analyzing the associated location in the quarantine table before for the secure hashed client ID for spam potential;
analyzing the second associated location in the quarantine table before the expiration for the second secure hashed client ID for spam potential; and
allowing the client device to access the associated location and the second associated location in the second quarantine table.

* * * * *